United States Patent [19]

Underwood

[11] Patent Number: 5,256,287
[45] Date of Patent: Oct. 26, 1993

[54] CARTRIDGE FILTER FOR FAUCET ATTACHMENT

[75] Inventor: David T. Underwood, Fort Worth, Tex.

[73] Assignee: Ametek, Inc., Plymouth Products Division, Sheboygan, Wis.

[21] Appl. No.: 975,620

[22] Filed: Nov. 12, 1992

[51] Int. Cl.⁵ .............................................. B01D 24/12
[52] U.S. Cl. .................................. 210/282; 210/288; 210/443
[58] Field of Search ............... 210/282, 449, 232, 443, 210/288

[56] References Cited

U.S. PATENT DOCUMENTS

| | | | |
|---|---|---|---|
| 3,841,484 | 10/1974 | Domnick | 210/282 |
| 4,271,015 | 6/1981 | Moore | 210/282 |
| 4,814,078 | 3/1989 | Stern et al. | 210/282 |
| 5,017,286 | 5/1991 | Heilgman | 210/282 |
| 5,092,993 | 3/1992 | Goodwin | 210/287 |
| 5,110,479 | 5/1992 | Frommer et al. | 210/282 |

FOREIGN PATENT DOCUMENTS 3-106489  5/1991  Japan ................................ 210/282

Primary Examiner—Stanley S. Silverman
Assistant Examiner—Cynthia L. Nessler
Attorney, Agent, or Firm—Andrus, Sceales, Starke & Sawall

[57] ABSTRACT

A faucet-attached filter apparatus for filtering drinking water includes a unitary filter cartridge subassembly which provides a housing for the filter media, inlet and outlet porous media retainers, the filtered water outlet passage, and a quarter-turn connector with seal for simple cartridge insertion and removal from the filter housing.

10 Claims, 3 Drawing Sheets

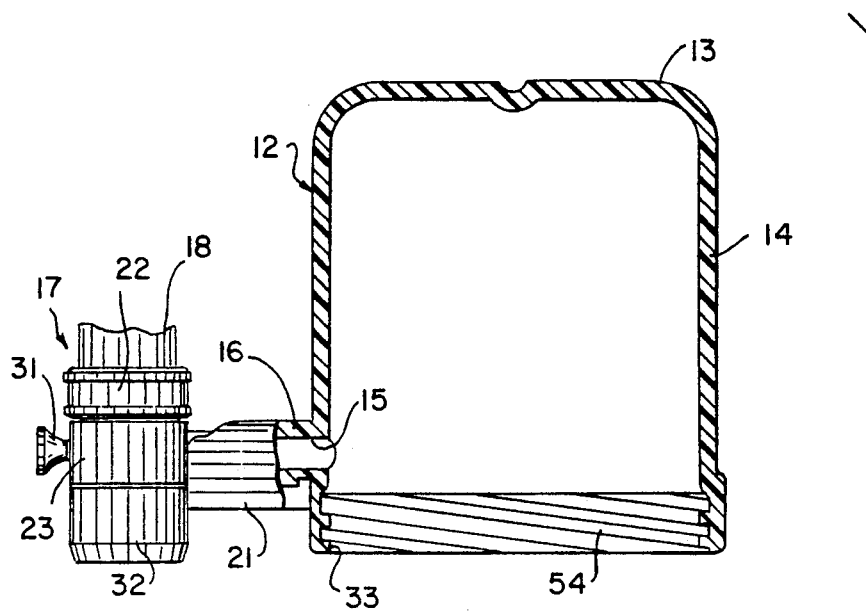
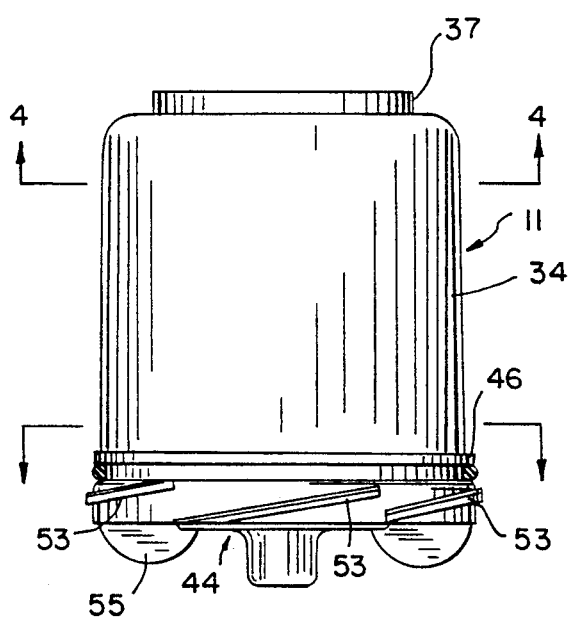
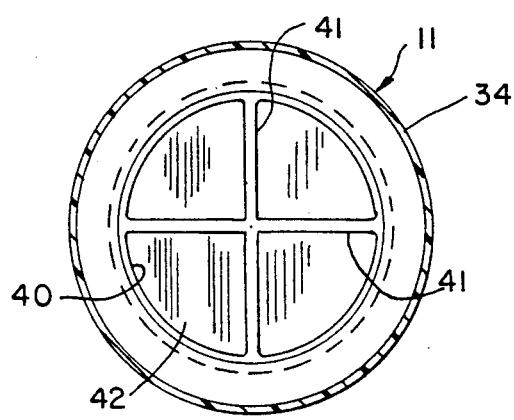
FIG. 3
FIG. 4

CARTRIDGE FILTER FOR FAUCET ATTACHMENT

BACKGROUND OF THE INVENTION

The present invention relates to a drinking water filter for attachment to a faucet and, more particularly, to a filter apparatus which includes a filter cartridge that is quickly and simply removable.

Small drinking water filters which are directly attachable to a conventional faucet are well known in the art. These filters typically include an external housing including an integral means for attaching the housing to the faucet and a replaceable filter cartridge which is inserted in the housing and may be periodically replaced. The filter media contained in the replaceable cartridge is typically activated carbon which is effective in removing suspended materials, as well as certain undesirable tastes and/or odors from drinking water. Other types of filter media may also be used, such as for example an iron removal material. The faucet connection from the housing also typically includes a manually operable valve allowing the user to selectively allow tap water from the faucet to be directed straight through the connection without filtering or to divert the water from the faucet through the filter. U.S. Pat. Nos. 4,686,037, 4,172,796 and 3,853,761 are typical of prior art constructions.

All of the foregoing prior art filter constructions suffer from a number of deficiencies. The filter housing must typically be removed from the apparatus to expose the filter cartridge which is, in turn, removed and replaced as a separate element. In addition, other separate parts, such as O-rings, gaskets and the like, are also typically removed when the filter housing is opened and require careful replacement with the replacement cartridge. Disassembly of these units for filter cartridge replacement typically involves at least two and sometimes three sealed joints, each of which must be carefully resealed when the cartridge is changed and the housing is replaced. Seals that are intended to remain permanently in place in these prior art constructions are subject to deterioration and leakage over time. The filtered water discharge opening comprises a permanent part of the housing construction in prior art devices and is subject to deterioration and to a build up of deposits remaining in the filtered water. Finally, prior art cartridge filter devices, requiring removal of the outer housing, also inherently expose the interior of a large part of the filter construction to view by the user. The result is the exposure of often times very unsightly (though harmless) deposits left by the unfiltered tap water.

There is a need, therefore, for a cartridge filter for faucet attachment which overcomes the deficiencies noted in prior art devices and which is of simple construction, including an easily replaceable filter cartridge.

SUMMARY OF THE INVENTION

In accordance with the present invention, a faucet filter apparatus for filtering drinking water from a conventional faucet includes a unitary filter cartridge which includes an integral filtered water outlet and single O-ring seal, all of which are removable as a unit and replaced with each cartridge change.

The filter apparatus of the preferred embodiment of the present invention includes an outer housing for the filter cartridge which has an enclosed top and a generally cylindrical outer wall and which includes an inlet opening for water from the faucet. A connector attaches the inlet opening in the housing to the faucet to direct water from the faucet into the inlet. The lower edge of the cylindrical outer housing wall defines a large circular bottom opening into which the unitary filter cartridge is demountably secured. The filter cartridge includes a closed, outer cylindrical shell which extends into the interior of the housing when secured in place. The filter cartridge shell has an outer surface spaced radially from the interior of the housing to define an annular space which provides open communication between the water inlet opening and the top of the filter cartridge. The cartridge includes a filter inlet in the top of the shell for admitting water from the annular space, and a filtered water outlet in the bottom of the shell for the discharge of filtered water. The interior of the cartridge shell between the filter inlet and water outlet is filled with a filter media, such as granular activated carbon.

The connector between the filter housing and the faucet preferably includes a diverter valve selectively positionable to either divert water through the filter or to pass water from the faucet directly through the connector. In the preferred embodiment, the inlet opening to the housing is adjacent the lower edge of the outer housing wall directly above the circular bottom opening. The inlet opening preferably comprises a tubular nipple formed integrally with the housing outer wall and into which a suitable attachment on the connector may be inserted.

The filter cartridge preferably includes a first porous media retainer which is mounted across the filter inlet on the upper end of the cartridge sleeve, and an annular end cap which is attached to the lower edge of the shell and defines the filtered water outlet. A second porous media retainer is preferably mounted across the filtered water outlet. The filtered water outlet in the cartridge end cap includes a water discharge nozzle positioned downstream of the second porous media retainer. The porous media retainers act to hold the granular activated carbon filter media within the filter cartridge. The porous media retainers are preferably comprised of rigid disks of porous polyethylene.

In the preferred embodiment, the peripheral edge of the filter cartridge end cap and the circular bottom opening of the filter housing are provided with matching quarter-turn threads for easy filter cartridge removal and replacement. The interface between the end cap and the housing opening is sealed by a continuous O-ring seal attached to and removable with the filter cartridge.

BRIEF DESCRIPTION OF THE DRAWINGS

FIG. 3 is an exploded view of the apparatus of FIG. 1 showing the unitary construction of the filter cartridge assembly, including the sealing ring and end cap.

FIG. 4 is a horizontal sectional view through the filter cartridge taken on line 4—4 of FIG. 3.

DETAILED DESCRIPTION OF THE PREFERRED EMBODIMENT

Figure 1:
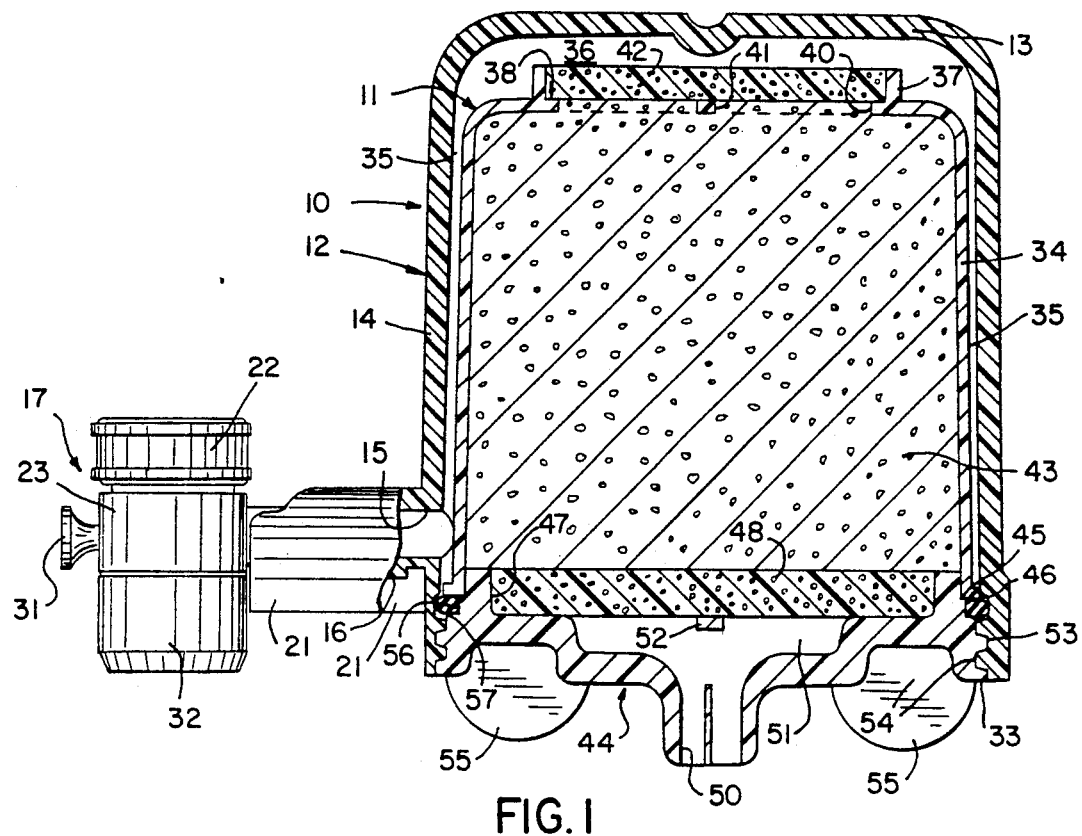
FIG. 1 is a vertical side elevation, partly in section, showing the filter apparatus of the present invention.

The faucet filter 10 of the present invention is shown in a fully assembled condition in FIG. 1 (part of which is in section), and in a disassembled condition in FIG. 3. It is an important and significant feature of the present invention that the filter cartridge 11 can be removed from the filter housing 12 as a unitary subassembly without the removal of the housing or any other separate parts. In addition, replacement of the filter cartridge 11 effects automatic replacement of other filter parts which may be subject to deterioration, wear, or undesirable build up of residues.

Figure 2:
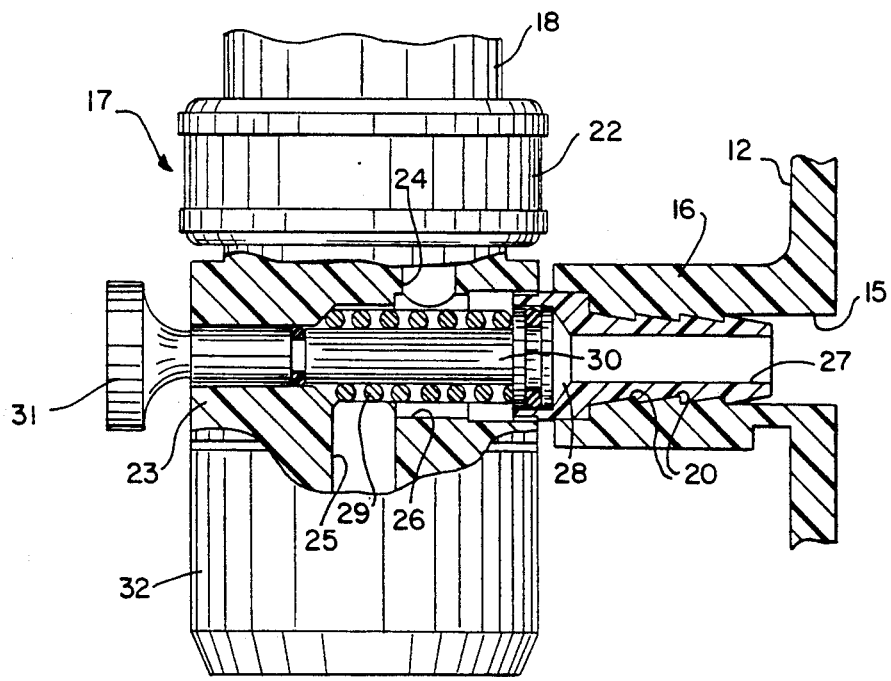
FIG. 2 is an enlarged side elevation, partly in section, showing a standard valved connector by which the filter housing is attached to a faucet.
Figure 5:
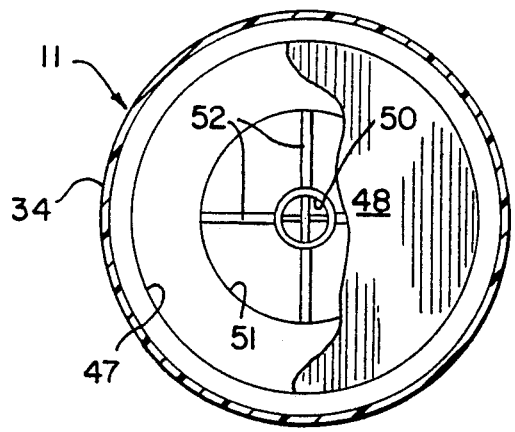
FIG. 5 is a similar sectional view through the filter cartridge taken on line 5—5 of FIG. 3.
Figure 6:
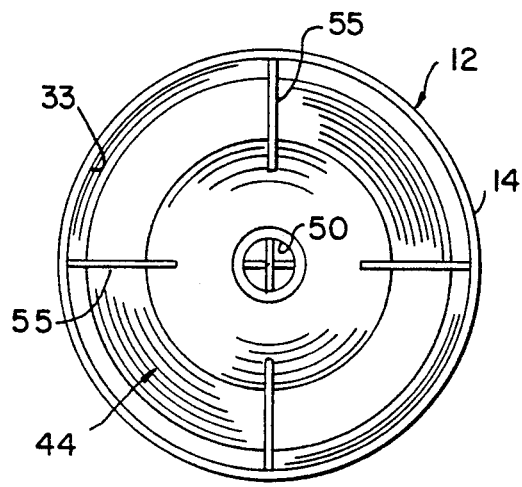
FIG. 6 is a bottom plan view of the filter housing and cartridge shown in FIG. 1.

The filter housing 12 is a unitary molded plastic piece generally in the shape of an inverted cup defined by a closed top 13 and a generally cylindrical outer wall 14. Near the lower edge of the outer wall 14, an inlet opening 15 to the housing is defined by an integral cylindrical nipple 16. The nipple provides for connection to a conventional diverter valve 17 which provides a selective fluid interconnection between the filter housing 12 and a faucet 18 (see FIGS. 2 and 3). The interior of the nipple 16 defining the inlet opening 15 may be provided with a series of annular ribs 20 to enhance the connection to the diverter valve 17. In addition, the exterior of the nipple 16 may be provided with an integral web 21 to stiffen and strengthen the integral attachment of the nipple to the housing 12.

The diverter valve 17, which is of a conventional construction, includes a swivel collar 22 rotatably attached to a valve body 23 and internally threaded for attachment to the threaded outlet of a conventional faucet 18. The valve body 23 includes vertical tap water inlet passage 24 and Outlet passage 25 extending radially in opposite directions from a central through bore 26. A hollow connecting barb 27 is secured in one end of the through bore 26 and is adapted to be inserted into the interior of the cylindrical nipple 16 and secured permanently therein, as with an adhesive. The interior of the connecting barb 27 at its connection to the valve body 23 defines a seat for a valve member 28 attached to one end of a valve stem 30, the opposite end of which extends through the valve body to an integral exterior operating knob 31. The valve member 28 is normally biased to close the interior of the connecting barb 27 and, therefore, prevent the flow of tap water from the inlet passage 24 into the inlet opening 15 of the filter housing 12. In this position, tap water flows directly through the valve body 23 and out the tap water outlet 25 which may include a conventional aerator attachment 32. When it is desired to filter the tap water, the valve stem is pulled axially against the bias of the spring 29, causing the valve member 28 to unseat from the hollow connecting barb and move axially into the valve body to close off the tap water outlet 25. While the valve stem is held manually in the divert position, tap water entering inlet passage 24 is directed through the connecting barb 27 and inlet opening 15 into the filter housing 12. Release of the operating knob 31 allows the bias spring 29 to re-seat the valve member 28 and close the connection to the filter housing.

Figure 7:
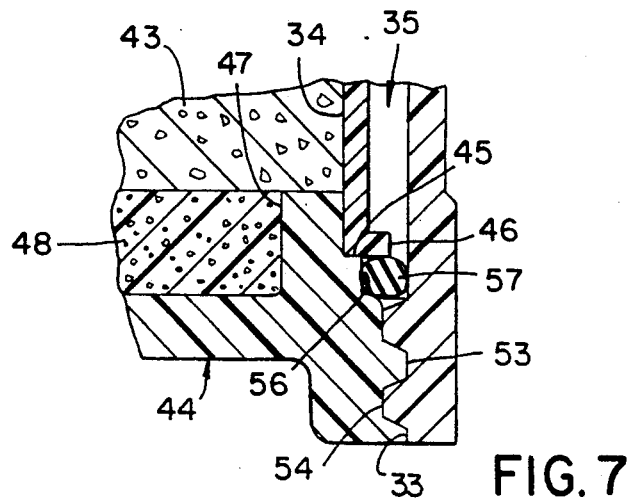
FIG. 7 is an enlarged sectional detail of the threaded connection and seal between the filter cartridge and the housing of the present invention.

The lower edge of the cylindrical outer wall 14 of the filter housing 12 defines a circular bottom opening 33 defining the maximum inside diameter of the housing 12. As best shown in FIG. 3, the unitary subassembly of the filter cartridge 11 is adapted to be inserted from below through the bottom opening 33, secured in position with a quarter-turn threaded connection and simultaneously sealed to prevent leakage. Referring also to FIGS. 4-7, the filter cartridge 11 includes a generally cylindrical outer shell, which preferably includes a slight axial taper, and is sized to fit within the filter housing 12 to define an annular space 35 between the housing wall 14 and the cartridge shell 34, as best seen in FIGS. 1 and 7. When the filter cartridge 11 is fully attached to and seated within the housing 12, the top of the cartridge is spaced axially from the top 13 of the housing 12 to define an open space 36 providing communication between the annular space 35 and the top of the cartridge.

The top of the cylindrical shell 34 of the filter cartridge includes a circular rim 37 surrounding an integral annular shoulder 38 defining a filter inlet 40 in the top of the cartridge. A pair of integral mutually perpendicular supporting struts 41 extend diametrically across the filter inlet 40. A first porous media retainer 42, preferably comprising a rigid circular disk of porous polyethylene is pressed into the circular rim 37 to rest on the annular shoulder 38 and supporting struts 41. The porous retainer 42 may have a nominal pore size of 50 microns. The interior of the filter cartridge shell 34 is filled with a granular filter media, such as activated carbon. The lower end of the cartridge shell 34 is closed by an annular end cap 44. The open lower edge of the cylindrical cartridge shell 34 is provided with an integral peripheral lip 46 which seats on an upper annular shoulder 45 on the end cap 44 when the end cap is inserted into the open end of the shell 34. The end cap is secured permanently to the cylindrical shell in any convenient manner, as by spin welding, sonic welding, or adhesives.

The end cap 44 includes an interior annular recess 47 into which a second porous media retainer 48, also preferably comprising a rigid disk of porous polyethylene, is pressed. The media retainers 42 and 48 serve to retain the granular filter media 43 in the cartridge shell and to provide added filtering capability. The first or upper porous media retainer will help filter out coarser particulates in the inlet water and the second lower porous media retainer 48 will prevent small particulates in the filter media 43 from passing out of the filter with the filtered water.

The end cap 44, below the interior annular recess 47, is provided with a stepped configuration terminating centrally in a small diameter discharge nozzle 50 for filtered water. The discharge nozzle 50 flares interiorly of the end cap to the annular recess 47 to define a filtered water chamber 51 from which water passing through the second porous media retainer is funneled to the discharge nozzle 50. A pair of mutually perpendicular supporting struts 52 extend across the chamber 51 at the level of the annular recess 47 to provide additional support for the porous media retainer 48.

The outer periphery of the end cap 44 is provided with a series of large pitch thread segments 53 which are adapted to engage and mate with an interior thread pattern 54 formed in the lower edge of the outer wall 14 of the filter housing 12. The engaging threads 53 and 54 provide simple quarter-turn attachment of the filter cartridge within the housing. Insertion and removal of the cartridge 11 is facilitated by a set of circumferentially spaced finger tabs 55 molded integrally into the bottom face of the end cap 44. When the end cap 44 is inserted into and secured in the cylindrical cartridge shell 34, the circular rim 37 on the cartridge shell and a rounded shoulder 58 just above the thread segments 53 together define an annular groove 56 into which an O-ring 57 is secured. When the filter cartridge 11 is secured within the housing 12 by engagement of the thread segments 53 with the interior thread pattern 54, the O-ring 57 engages the interior cylindrical wall of the housing 12 to provide a leak-tight seal. It should be noted that the O-ring 57 is the only seal which is used and displaced during filter cartridge removal and replacement. Furthermore, because the O-ring is attached to the cartridge, it is automatically replaced with the filter cartridge, thereby avoiding deterioration of a primary seal. The unitary construction of the cartridge subassembly also avoids the presence of loose parts and obviates the need to separately remove the filter housing to obtain access to the cartridge, as in many prior art filter constructions. By eliminating the need to open the filter housing to direct view by the user, the often times unsightly interior of the housing, resulting from the unavoidable build up of mineral deposits, slime and the like, is avoided. The inclusion of the end cap 44 with the integral filtered water chamber 51 and discharge nozzle 50 allows the user to replace all of the filtered water passages with replacement of the filter cartridge. This allows the replacement of parts which may also be subject to a build up of mineral scale and similar deposits which adversely affect the appearance of the filter assembly.

The flow of water through the system is direct and straightforward. When the valve member 28 in the diverter valve 17 is manually opened, the flow of water into the inlet opening 15 in the housing continues around and through the annular space 35 and into the open space 36 at the top of the cartridge, down through the upper porous media retainer 42, the filter media 43 and lower porous media retainer 48, and out through the discharge nozzle 50. The large diameter inlet and outlet in the filter cartridge 11 allow optimum use of the volume of filter media 43.

Various modes of carrying out the present invention are contemplated as being within the scope of the following claims particularly pointing out and distinctly claiming the subject matter which is regarded as the invention.

I claim:

1. A faucet filter apparatus for filtering drinking water from a conventional faucet, said filter apparatus comprising:

an outer housing having an enclosed top and generally cylindrical outer wall;

an inlet opening in the outer wall for water from the faucet;

connector means for attaching the outer housing to the faucet to direct water from the faucet into the inlet opening;

the lower edge of the cylindrical outer wall defining a circular bottom opening;

a filter cartridge including means for demountably securing said cartridge in the circular bottom opening, said cartridge comprising a unitary subassembly including a closed outer cylindrical shell extending into the interior of the outer housing, said shell having an outer surface spaced radially from the interior of the housing to define an annular space providing open communication between the inlet opening and the top of the shell, a filter inlet in the top of the shell for admitting water from the annular space, and an annular end cap permanently attached to the lower edge of the cylindrical shell, said end cap defining a filtered water outlet in the bottom of the shell, said outlet forming the final filtered water discharge outlet from the apparatus;

the interior of the shell between the filter inlet and the water outlet filled with a filter media; and, wherein the means for demountably securing the filter cartridge in the housing comprises a threaded connection between the outer periphery of the end cap and said circular bottom opening, and continuous flexible sealing means adjacent said threaded connection for sealing the interface between the cartridge and the housing.

2. The apparatus as set forth in claim 1 wherein said connector means comprises a diverter valve postionable to selectively direct water through the filter and to pass water from the faucet directly through said connector means.

3. The apparatus as set forth in claim 1 wherein the flexible sealing means comprises an O-ring seal.

4. The apparatus as set forth in claim 1 wherein said inlet opening is adjacent the lower edge of the outer wall closely spaced from the circular bottom opening.

5. The apparatus as set forth in claim 4 wherein said inlet opening comprises a tubular nipple formed integrally with said outer wall.

6. The apparatus as set forth in claim 1 wherein said filter cartridge further comprises:

a first porous media retainer mounted across the filter inlet; and, a second porous media retainer mounted across the filtered water outlet.

7. The apparatus as set forth in claim 6 wherein said filtered water outlet includes a water discharge nozzle integrally formed in said end cap and positioned downstream of said second porous media retainer.

8. The apparatus as set forth in claim 6 wherein said threaded connection comprises:

external annular threads on said end cap; and, mating internal annular threads on said circular bottom opening.

9. The apparatus as set forth in claim 6 wherein said filter media comprises a bed of granular activated carbon.

10. The apparatus as set forth in claim 9 wherein said first and second media retainers comprise rigid disks of porous polyethylene.

* * * * *